Dec. 24, 1957  J. G. YAHNKE  2,817,600
WAX SIPHON SPRAY PROCESS
Filed June 7, 1955  2 Sheets-Sheet 1

Inventor
James G. Yahnke
By Paul L. Ahern
Attorney

Dec. 24, 1957     J. G. YAHNKE     2,817,600
WAX SIPHON SPRAY PROCESS
Filed June 7, 1955     2 Sheets-Sheet 2
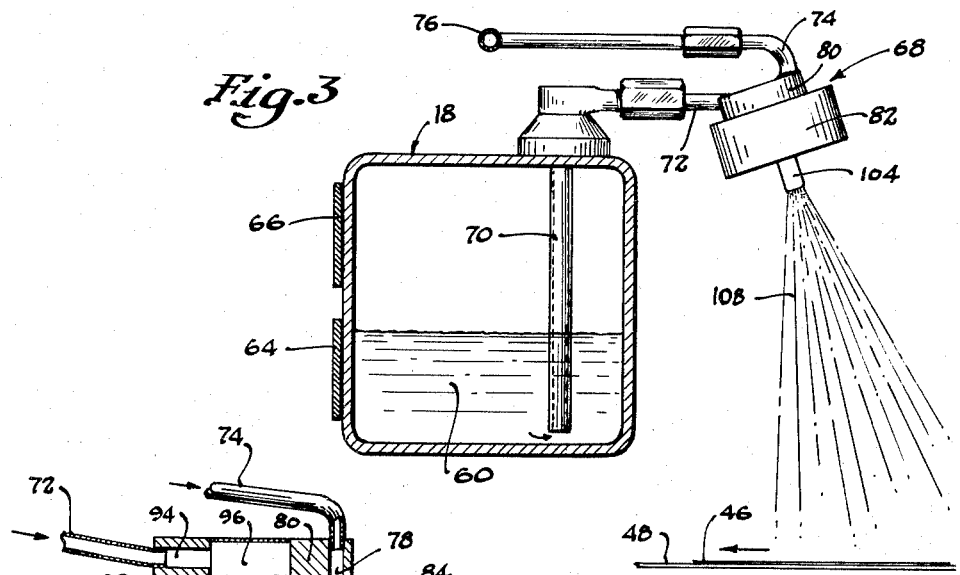
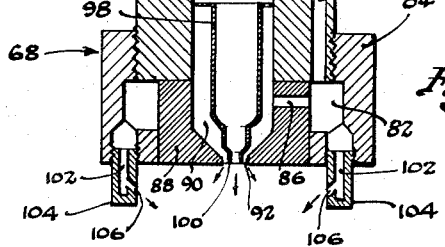
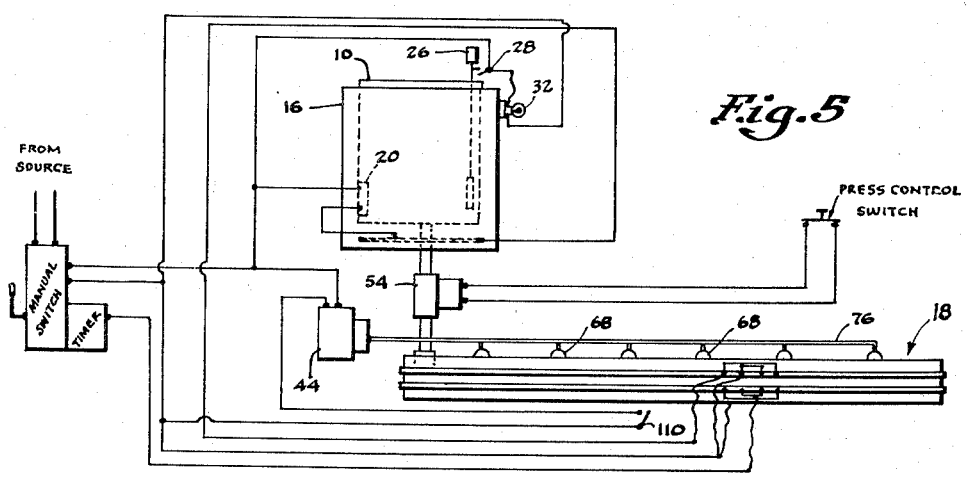
Inventor
James G. Yahnke
By Paul L. Ahern
Attorney United States Patent Office 2,817,600
Patented Dec. 24, 1957

2,817,600

WAX SIPHON SPRAY PROCESS

James G. Yahnke, Libertyville, Ill.

Application June 7, 1955, Serial No. 513,680

6 Claims. (Cl. 117—104)

This invention relates to a spray device and more particularly to a device for spraying liquids in response to an intermittent signal. The invention also relates to a novel spray method.

In the printing art it has been a practice for some time to coat a printed sheet with wax to protect the printing on the sheet from becoming damaged by abrasive contact with other sheets. The previously known devices never proved completely satisfactory, however, because of inefficient operation.

It is therefore a principal object of this invention to provide a liquid spray device characterized by efficient and positive operation for preventing offset in printed material.

Another object of the invention is to provide a liquid spray device characterized by remotely controlled intermittent operation.

A further object of the invention is to provide an improved method of spraying a liquid by a siphon principle.

Still another object of the invention is to provide an improved method of preventing offset in printing by spraying wax onto a printed material.

A still further object of the invention is to provide an improved spray head operating on the siphon principle and characterized by fast and substantially dripless cut-off.

These and other objects and advantages of the invention will become apparent upon a reading of the following detailed description of the invention taken in conjunction with the accompanying drawings in which:

Figure 3 is a sectional view taken along the lines 3—3 of Fig. 2;

Figure 4 is a cross-sectional view through one embodiment of a spray head according to the invention, and Figure 5 is an electrical wiring diagram showing the control features of the invention.

In the accomplishment of the foregoing objects and in accordance with the practice of this invention there is now provided a device for spraying hot liquids which comprises a heated supply tank for said liquid, an elongated, heated container for hot liquid positioned adjacent an object to be sprayed, means connecting said tank with said container, siphon spray means mounted adjacent said container and adapted to withdraw liquid therefrom in response to the passage of compressed air through said means, and means for starting and stopping the flow of said compressed air, preferably by remote control actuated by the passage of an object to be sprayed past a reference point.

The means connecting the tank with the container is preferably adapted to maintain a constant level of liquid in the container, as by a float controlled valve. The container is open to the atmosphere and may have one or a plurality of siphon spray heads extending therein and being supplied therefrom.

There is also provided a method for spraying a hot liquid which comprises heating a supply of hot liquid such as molten paraffin wax, passing said liquid into an elongated container positioned adjacent an object to be sprayed, siphoning liquid from said container into a spray nozzle by passing compressed air past the end of said nozzle, mixing the air and liquid after emission from the nozzle, and directing said mixture onto an object to be sprayed.

Figure 1:
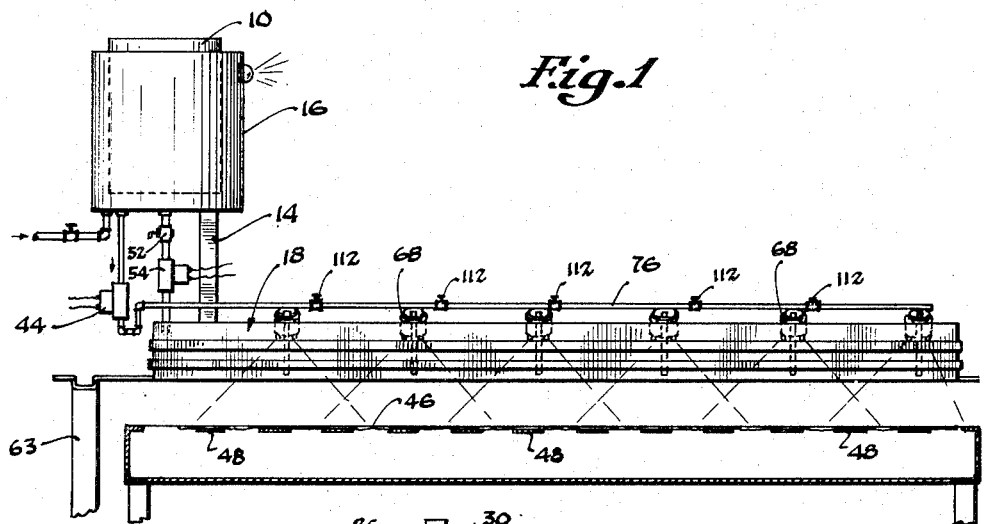
Figure 1 is an elevational view of one embodiment of a spray device according to the invention.
Figure 2:
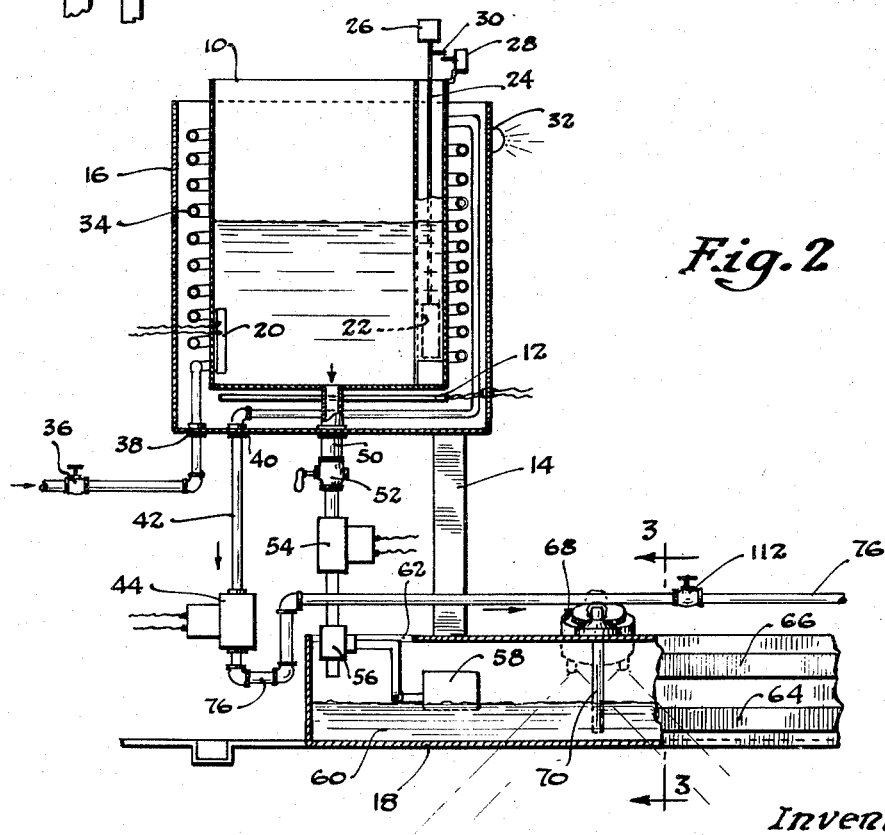
Figure 2 is a view partly in vertical section and partly in elevation of the supply and control elements of a device according to the invention.

Considering the drawings in greater detail the device illustrated in Figs. 1 and 2 consists of a heating and supply tank 10 which is heated by the electrical element 12 or other suitable, readily controllable source of heat. The tank is contained within a shell 16 which in turn is mounted on the support member 14 above the hollow supply bar 18. A thermostatic control 20 is positioned within the tank 10 and is connected to the heating element 12 to maintain the contents of the tank at a predetermined temperature. A float 22 is provided within said tank and is connected by a rod 24 to a signal element 26. A switch 28 is adapted to be closed by a finger 30 attached to the rod 24 and to energize an indicating light 32 mounted on the shell 16 or at any suitable remote location.

The space between the tank 10 and the shell 16 is used for heating the compressed air supply to the sprayers. As illustrated in Fig. 2 one may employ a spirally wound tube 34 through which the air passes after having been admitted by the valve 36 from the source (not shown). It will be apparent that the space may be sealed except for an inlet and outlet for air and the tube or coil 34 may be eliminated. In such case the circulating air will pick up heat from the sides of the hot tank 10 and from the element 12. Suitable inlet and outlet openings could correspond to the openings 38 and 40 in the shell 16 which receive the tubing 34.

The hot (or heated air) leaves the heated space and passes through the pipe 42 to the solenoid operated valve 44 which is adapted to be opened and closed in response to an electrical stimulus from a remote location. In the present case the stimulus is provided by the actuation of an electrical switch (not shown) by the passage of a sheet of material to be printed past a determined location. For instance a sheet of paper or cardboard 46 (Fig. 1) carried on a web or conveyor 48 can be used to trip a biased lever (not shown) and actuate the switch, signalling through the solenoid to the valve 44 and opening said valve to pass air to the sprayers. When the sheet 46 has passed the reference point the lever returns to initial position, shutting off the supply of air to the sprayers as will be explained in more detail later. As another embodiment of the idea one may employ an electronic "eye" and beam of light which is interrupted by the passage of a sheet through the beam, and the interruption being used by conventional methods to actuate the solenoid valve 44.

A supply of heated liquid such as molten paraffin wax is prepared in the tank 10 and passes through the pipe 50 and the manually operated valve 52 to the solenoid operated valve 54 which is so connected to the operating switch (not shown) of the printing press that said valve will be open when the press is running but will close when the press stops. This is a safety feature to prevent accidental overflow of wax from the supply bar 18 onto the press frame and mechanism.

The molten wax passes from the solenoid valve 54 to a discharge valve 56 (Fig. 2) which is controlled by a lever system originating in the float 58. The float rides on the surface of the liquid 60 in the supply bar 18 and as the liquid is used up the float opens the valve 56 and allows more liquid to enter from the tank 10. In preferred practice the bar 18 is substantially square and is maintained about half-full of liquid during operation. In one embodiment the bar 18 is about 2 inches square and about 1 inch of molten paraffin is maintained during operation. An opening 62 is provided in one end of said bar 18 to admit the float 58 and the discharge valve 56, and to vent the bar so that the sprayers may function properly. The bar is supported as at 63.

Strip heating elements 64 and 66 are attached to a side of the bar 18, preferably to the side opposite the spray nozzles although other locations may be suitable also. One of the elements, usually the lower, 64 is connected in parallel with the heater 12 of the tank 10 so that the bar 18 will operate at substantially the same temperature as the tank. The other of the elements, usually the upper, 66 is connected to a timing device and is used principally as a heating-up or preheating aid. For example, the timer may be set to turn on the element 66 about 30 minutes before the press and spray unit are expected to be in operation.

Coming now to the spraying element itself there is illustrated in Figs. 1, 2 and 3, a spray head 68 (or several of them) which is mounted on the bar 18, and a conduit 70 extends from said head to a point beneath the surface of the liquid 60. The head 68 has service lines 72 for liquid and 74 for compressed air, and the latter is connected to a service main 76 which communicates with the air solenoid valve 44.

Fig. 4 shows the structure of the spray head 68 in cross-sectional detail. Compressed air is conveyed to the head 68 through the line 74 and passes through a conduit 78 in the upper portion 80 of the head. The conduit 78 communicates with a chamber 82 formed between the lower ring 84 of the head and the upper portion 80. A small hole 86 is provided in the inner element 88 (or a plurality of holes may be provided if desired) and connects the chamber 82 with an inner air chamber 90. Compressed air leaves the chamber 90 by the small circular opening 92 in the element 88.

Molten wax or other hot liquid is sucked up through the conduit 70 from the liquid supply in the bar 18 (Fig. 3). Said wax passes through the pipe 72 to the spray head 68 and enters the head through the opening 94. A chamber 96 is formed by the restrictive unit 98 which graduates stepwise from larger to smaller size at the discharge end. The air rushing past the nozzle opening 100 creates a vacuum which draws molten wax from said nozzle and sprays it outwardly from the head 68.

Compressed air also passes from the chamber 82 into the openings 102 in the center of the protruding elements 104. Air escapes from said element through a single angled opening 106 in each and the stream of air so emitted passes through the cone of air and wax issuing from the center of the head and spreads said cone to a wide but rather thin spray pattern. In Fig. 3 for instance the spray pattern 108 is shown depositing wax on the paper 46 being carried through said pattern by the conveyor 48.

In the preferred operation of the device one charges the material to be heated, such as paraffin wax, into the tank 10. Wax is put into the tank 10 in the form of flakes, blocks or chips. Current is applied to the heating element 12 to melt the wax and current is simultaneously applied to the heating element 64 on the bar 18 to preheat the bar 64 and the spray nozzle assembly. If the device is being put back into operation after setting overnight with wax in it, the timer (Fig. 5) may be preset to supply current to the preheat element 66 on the bar 18.

When the wax in the system is molten and at proper operating temperature (between about 110° F. and 400° F.) the press is started and printing of the sheets is begun. When the first sheet passes a predetermined reference point it actuates a lever or cuts a beam of light thereby energizing a switch 110 (see Fig. 5) which closes the circuit and energizes the solenoid air valve 44 to admit compressed air from the source of the air system of the device. Compressed air passes through the pipe 76 to the individual spray head 68 which, incidentally, can be closed off by means of the valves 112 (Figs. 1 and 2) so that one or any desired number of spray heads can be operated at will.

As compressed air passes through the spray head 68 it creates a vacuum on the wax discharge nozzle 100 and draws wax from the supply in the bar 18 to the nozzle. Here the wax is atomized into tiny globules which solidify in the air before striking the sheet of paper 46. The tiny wax pellets adhere to the printed sheet and successfully prevent offset of the partially dried printing ink and sticking of the sheets to one another. The wax pellets provide a desirable feel and gloss to the sheet and cause the sheets to slide over one another with ease.

When molten wax is withdrawn from the bar 18 the supply will be continually replenished by the action of the float activated valve 56 which allows wax to drain from the tank 10. When the supply in the tank becomes low the float gauge turns on the indicator light and warns the operator to put more wax in the tank.

When the end of the printed sheet which may, of course, be quite small or may range in size up to a large roll of paper or the like, passes the predetermined reference point the lever (biased) or the electric beam will energize the solenoid valve 44 to close and stop the flow of compressed air to the spray heads. The heads will stop spraying instantaneously thereby providing one of the significant advantages of this apparatus. That is, the spray is stopped instantaneously with no overspraying beyond the paper sheet and no dripping. This occurs because the wax is being drawn up to the spray nozzle 100 by vacuum and the instant the vacuum is broken the weight of the column of wax in the pipe 70 tends to pull the wax back from the nozzle into the bar 18.

As previously indicated the molten wax issuing from the nozzle 100 solidifies quickly in the air and strikes the sheet in the form of tiny globules, adhering to the sheet in a thin layer. While the device illustrated in the accompanying drawings is shown operating over the paper sheet it will be apparent that the device may be so mounted that the spray heads spray the wax onto the bottom of a sheet passing over them, or onto a sheet passing alongside or in front of the device.

The amount of wax deposited on the sheet can be varied at will simply by increasing or decreasing the air pressure on the system. Increasing the air pressure causes a greater volume of air to pass through the nozzle, thereby drawing or siphoning a larger amount of wax. Decreasing the air pressure of course has the opposite effect.

While the device has been specifically described as a wax spray apparatus it is intended that the device may be used for any other suitable purpose. Liquids, emulsions, suspensions and dispersions, both hot and cold, may be sprayed by the device. For example, wax emulsions, paints, lacquers, varnishes, hot and cold water and the like may be applied by this method and apparatus, which has special, but not exclusive, application to the printing arts.

Among the materials which can be sprayed according to this invention are paper, cardboard, carton stock, plastic sheeting, pressed hardboard and like materials.

It will be apparent from the foregoing description of the invention that there is now provided a type of wax spray device which has features of design, control and operation not heretofore known to the art. Others may practice this invention in any of the numerous ways which will be suggested to one skilled in the art upon reading this description. All such practice of the invention is intended to be covered hereby provided it falls within the scope of the appended claims.

In the foregoing description the term "wax" is intended to cover a particular class of materials and is not limited to paraffin wax.

In addition to molten paraffin wax it is possible in the practice of this invention to spray other molten materials such as the molten vegetable waxes (carnauba), beeswax, the normally solid synthetic waxes of the polyethyleneglycol type and other synthetic waxy substances. Another important class of materials useful in this invention are the synthetic plastics which are molten (liquid) at higher temperatures somewhat above room temperature, but are solids at room temperature. Polyethylene, nylon and a large variety of other synthetic plastics have the desired characteristics and are useful either alone, in admixture with each other, or admixed with any of the natural or synthetic waxes.

The synthetic plastics have the advantage of being compatible with printing inks and can be printed over quite well.

Having described the invention, what is claimed as new is:

1. The method of siphon spraying wax which comprises maintaining a supply of wax in the molten state, siphoning a stream of said molten wax from said supply and simultaneously dispersing said stream into small particles by means of compressed air, and spraying said particles.

2. The method of siphon spraying a wax which comprises melting a supply of wax, drawing a stream of said molten wax from said supply by creating a vacuum zone adjacent the end of said stream, mixing said stream and a stream of compressed air adjacent said zone and simultaneously dispersing said mixture into small particles by compressed air, and spraying said particles.

3. In the method of siphon spraying wax onto a freshly printed sheet to prevent offset, the steps of melting a wax, siphoning said molten wax into a wax conduit by means of a stream of compressed air discharging past the open end of said wax conduit, mixing said air and liquid wax outside of said conduit upon discharge therefrom and simultaneously dispersing said mixture into small particles by compressed air, and depositing wax particles on said sheet.

4. In the method of spraying wax onto a freshly printed sheet to prevent offset the steps of melting a wax, siphoning said molten wax into a wax conduit by means of a stream of compressed air discharging past the open end of said wax conduit, mixing said air and liquid wax outside of said conduit upon discharge therefrom and simultaneously dispersing said mixture into small particles by compressed air, and intermittently interrupting the flow of said compressed air.

5. The method of claim 3 wherein said material is polyethylene wax.

6. The method of claim 3 wherein said material is a mixture of polyethylene wax and paraffin wax.

References Cited in the file of this patent

UNITED STATES PATENTS

| | | |
|---|---|---|
| 1,195,310 | White | Aug. 22, 1916 |
| 1,751,343 | Mack | Mar. 18, 1930 |
| 1,880,065 | Arpin | Sept. 27, 1932 |
| 1,889,507 | Watson | Nov. 29, 1932 |
| 2,048,912 | Ziska | July 28, 1936 |
| 2,314,329 | Erickson | Mar. 23, 1943 |
| 2,559,407 | Dalrymple | July 3, 1951 |
| 2,673,121 | Brennon | Mar. 23, 1954 |
| 2,698,309 | Thwaites | Dec. 28, 1954 |
| 2,708,095 | Mitchell | May 10, 1955 |
| 2,720,099 | Gronowski | Oct. 11, 1955 |